United States Patent
Benway

[19]

[11] Patent Number: 6,116,826
[45] Date of Patent: Sep. 12, 2000

[54] DRILLING JIG

[76] Inventor: Randy E. Benway, 810 Rice St., Horicon, Wis. 53032

[21] Appl. No.: 09/206,934

[22] Filed: Dec. 7, 1998

Related U.S. Application Data

[63] Continuation-in-part of application No. 09/013,710, Jan. 26, 1998, abandoned, and a continuation of application No. 08/677,442, Jul. 2, 1996, Pat. No. 5,807,033.

[51] Int. Cl.[7] ............................. B23B 35/00; B23B 47/28
[52] U.S. Cl. ..................... 408/1 R; 144/83; 144/144.1; 144/345; 144/372; 408/103; 408/115 R
[58] Field of Search ................. 408/1 R, 97, 103, 408/115 R; 144/344, 345, 346, 353, 372, 83, 144.1

[56] References Cited

U.S. PATENT DOCUMENTS

| | | | |
|---|---|---|---|
| 1,097,153 | 5/1914 | Wolgamood | 408/115 R |
| 1,153,841 | 9/1915 | Earle | 408/115 R |
| 1,776,537 | 9/1930 | Booth | 408/115 R |
| 2,268,930 | 1/1942 | Edwards | 408/103 |
| 2,804,788 | 9/1957 | Humphrey | 408/115 R |
| 2,838,966 | 6/1958 | Campbell | 408/115 R |
| 3,211,026 | 10/1965 | Calahan | 408/115 R |
| 4,137,003 | 1/1979 | Budoff | 408/115 R |
| 5,807,033 | 9/1998 | Benway | 408/115 R |

*Primary Examiner*—Daniel W. Howell
*Attorney, Agent, or Firm*—Ryan Kromholz & Manion, S.C.

[57] ABSTRACT

The present invention includes the apparatus and method to create an improved loose tenon joint with multiple arculate mortise surfaces and similarly configured loose tenon member for woodworking applications. A drilling jig is provided to axially guide a drill bit for boring a series of adjoining holes forming a mortise, and a router bit is provided to form a cooperating tenon. A first jig embodiment manipulates a slidable drilling guide bar maintaining longitudinally spaced thru-bores and a plurality of index holes. A second embodiment includes a stationary jig body having an opening that supports at least two drilling guides each having at least one thru-bore. A third embodiment provides a drilling guide bar slidably attached to a stationary support member by at least one indexing pin inserted through an elongated indexing aperture in the stationary support member and into an indexing hole in the guide bar. Preferably, the indexing pin and indexing hole are threaded. Each embodiment provides multiple guide holes for fast drilling with full drill bit contact area and preset hole spacing to produce a uniform and accurate mortise for a strong loose tenon joint system.

15 Claims, 9 Drawing Sheets

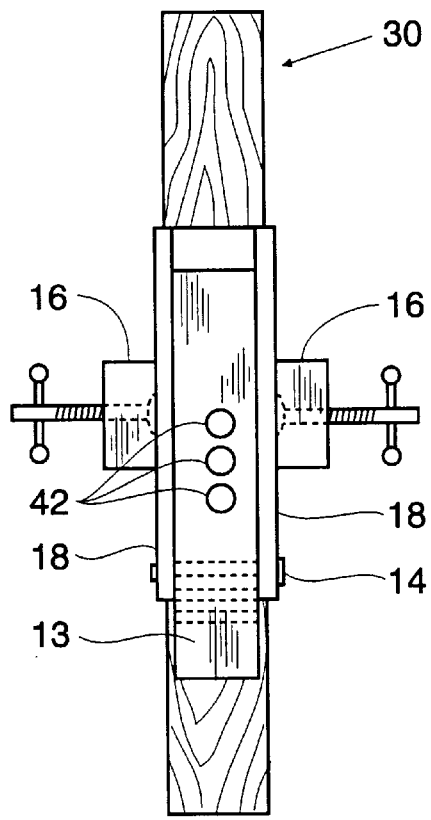
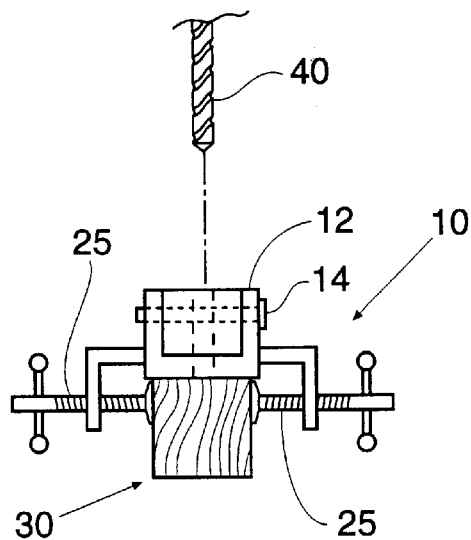
Fig. 4
Fig. 3
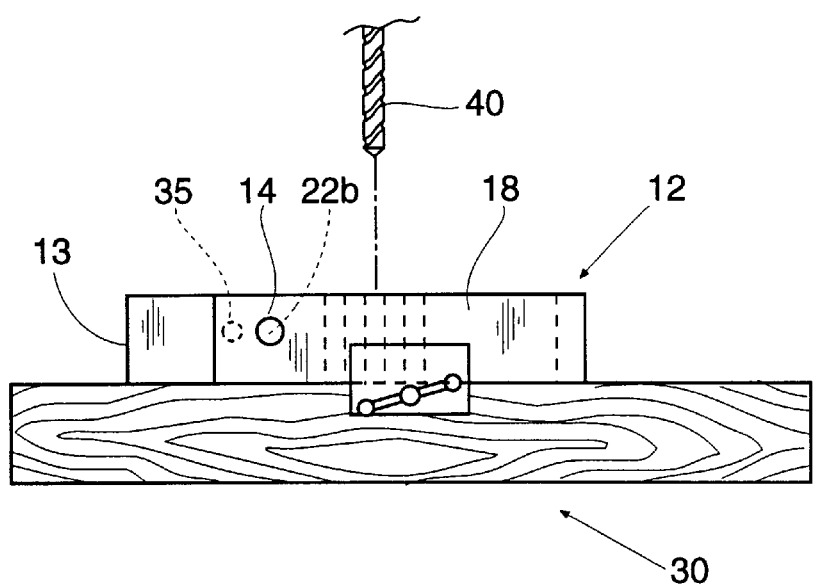
Fig. 5

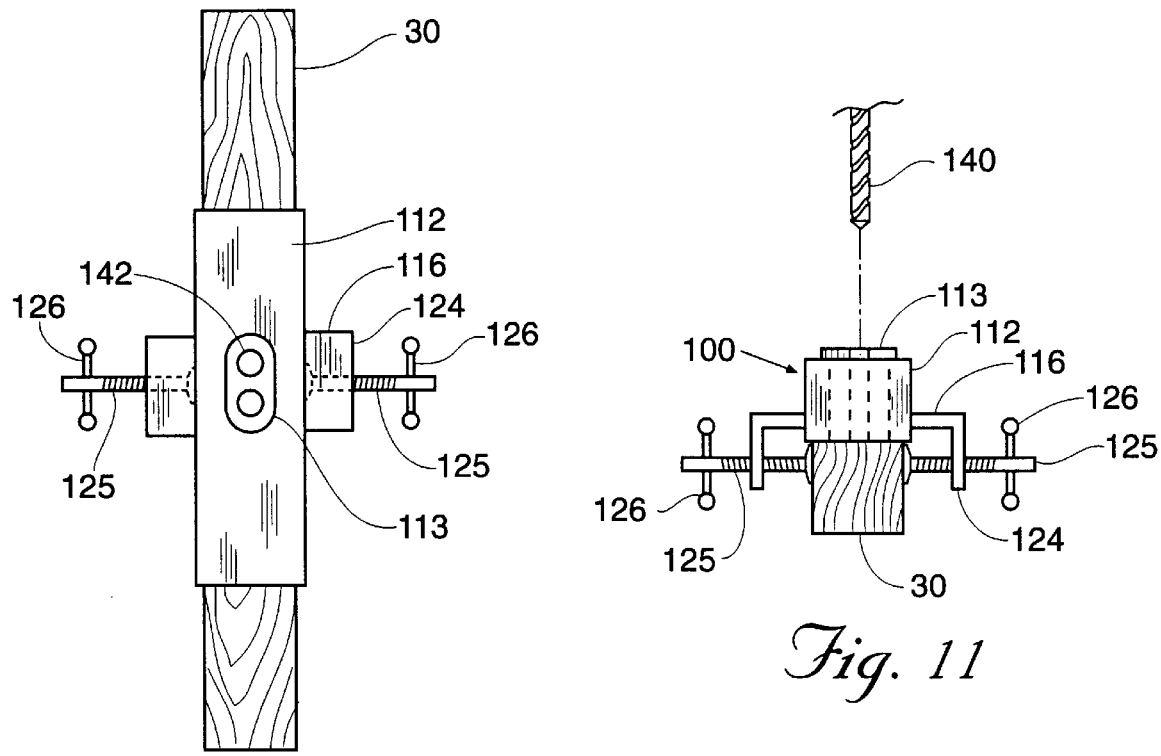
Fig. 10
Fig. 11
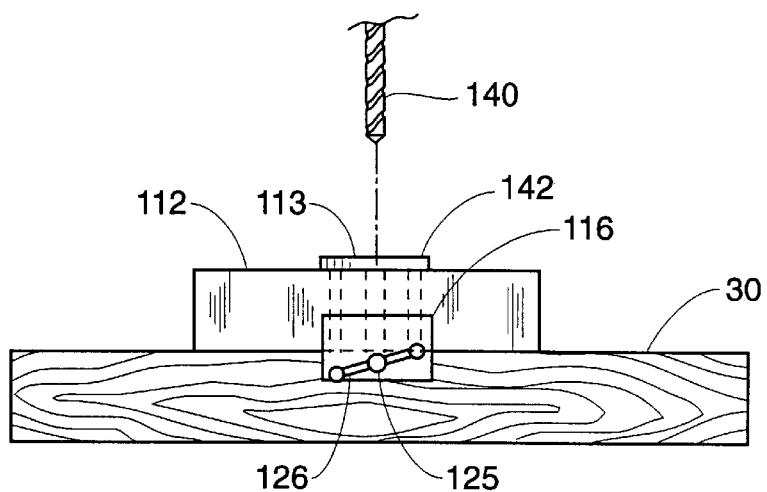
Fig. 12

DRILLING JIG

This application is a continuation-in-part of application Ser. No. 09/013,710, filed Jan. 26, 1998, which application is now abandoned and is in turn a continuation of application Ser. No. 08/677,442 filed Jul. 2, 1996, which application is now U.S. Pat. No. 5,807,033.

BACKGROUND OF THE INVENTION

The present invention relates generally to woodworking joints and drilling jigs used to produce them. More particularly, this invention relates to loose tenon joints and drilling jigs used to drill a mortise. In a loose tenon joint, both pieces of stock to be joined are mortised (slotted) and a section of precut tenon is inserted into the mortises securing the two members.

Articles appearing in "Fine Woodworking" magazine of March/April 1995, (pages 58–61) and January/February 1993 (pages 46–48) provide background of various mortise and tenon options, including loose tenon joinery. Some typical applications using loose tenon joints are doors, windows and cabinet casework. In general, a loose tenon joint is comprised of two wood members with similar sized mortises formed in each piece. An independent loose tenon member (matching the size of the mortises) is captured by the two mortises securing the joint. Conventional mortises have parallel planar surfaces with either square or rounded corners. Tenon stock can be purchased or prepared by the woodworker. Typically made in strips to match the mortise, loose tenons are cut from the strips as needed; a simple hand saw can be used. Loose tenon joints are strong because of the large tenon section through the joint and generous side-grain gluing surface needed for long life.

Many devices have been made for producing mortises in wood. The devices fall into three general categories: hand tools, machine tools, and drilling jigs. Mortising chisels have been used by craftsmen for decades to hand cut mortises for joinery and hardware. A mortising chisel is a heavy bladed tool designed to be struck with a mallet. The process is slow and requires skill to perform accurately.

Machine tools such as the hollow chisel mortiser and chain mortiser greatly speed the cutting process. The hollow chisel mortiser plunges a drill bit surrounded by a square hollow chisel into the wood producing a square hole; indexing the workpiece with each stroke of the chisel produces the mortise. The chain mortiser, suited to production work, manipulates a miniature chain saw chain and bar into the wood producing the mortise with a single pass. These tools are costly and are not designed to mortise into the ends of long or bulky workpieces as loose tenon joinery often requires. Router based machine tools have become the common method for cutting mortises for loose tenon joints. They can be used by either manipulating the tool along a jig affixed to the workpiece or mounting the router to a machine with a movable table. The stock is clamped to the table and the workpiece guided into the router tooling. Both methods produce a milled mortise with rounded corners; tenon stock is then prepared with corresponding round corners. The process is dirty and very noisy. In addition, the milled mortise is limited in depth by the length of router tools available. Also, manipulating the router (or wood if a stationary router is used) is difficult on long or large pieces.

Various drill guide jigs have been available for boring wood. Although most jigs guide a single drill for the purpose of producing a doweled joint, some jigs are designed to allow boring of a series of adjacent, overlapping holes. These jigs are intended to hog material prior to hand chiseling. Installing deep mortise door locks is a typical application.

The objective of the present invention is to produce an improved loose tenon joint with deeper multiple arcuate mortise surfaces for increased side grain gluing surface. The present invention provides for a low cost jig enabling the woodworker to easily produce accurate, deep mortises for the joint (even on long or bulky workpieces) using only a pistol drill. Additionally, the present invention contemplates the provision of router and/or shaper tooling to produce the tenon material on these conventional machine tools.

As previously described, various forms of loose tenon joinery exist in prior art. None of these variations allow for added side grain glue surface by incorporating the multiple arcuate surfaces described by the present invention, nor do they mortise in a single operation using only a pistol drill. Prior art router based tools are limited in mortise depth by the length of the router bit. In addition, accurately milling the end of a long workpiece is difficult using router tools. This invention uses a conventional drill bit to accurately produce a loose tenon joint of greater depth, increasing side grain glue surface, while the material is stationary. Prior art hollow chisel and chain mortisers do not have capacity to mortise the ends of long lengths commonly needed in loose tenon joinery.

Other wood boring drill jigs exist in prior art. One of the earliest concepts was illustrated in U.S. Pat. No. 62,491 granted J. Isenberg on Feb. 26, 1867. The tool provided a series of laterally spaced guide holes for receiving and supporting drill bits. U.S. Pat. No. 310,710 (Nichols) also provided a bit for guiding drilled openings with particular application for boring doors for locks. Again, U.S. Pat. No. 1,432,485 (Moller) illustrated a jig usable in assisting the drilling of a mortise for insertion of a door lock. This jig merely provided a gauge to ensure alignment of several drilled openings to be later chiseled to produce a square-cornered mortise. U.S. Pat. No. 3,211,026 (Calahan) discloses a jig body with multiple crescent shaped guide holes used to guide a drill bit for fast material removal prior to hand chiseling. This design does not provide the full drill bit guide contact of the present invention for improved hole orientation. Goggins jig, UK Patent 1,314,809 maintains full drill bit contact but requires that the user correctly set spacing between each drilled hole; this is inaccurate and slow. The present invention provides full drill bit contact area and preset hole spacing for maximum accuracy. In addition, other hole sizes and spacing, can be easily substituted. Gumbrell UK Patent Application, discloses a jig with a movable guide bar. The guide bar has a drilled bit guide hole and index holes (pinned through the jig body) that control drilled hole spacing. Gumbrell does not disclose the simple construction of the present invention, nor does it allow for fast drilling with multiple guide holes.

Additionally, the Gumbrell device does not lead the user through the correct drilling sequence; the drill will "walk" if a hole is attempted next to a previously drilled hole. The present invention solves the problem encountered in the prior art, while simplifying the structure and performing more functions. The inventor is not aware of any prior art structure that teaches or discloses the invention disclosed and claimed herein.

SUMMARY OF THE INVENTION

In accordance with the present invention, a novel and useful drilling jig is herein described.

The drilling jig of the present invention has particular application in configuring each of facing mortises formed in abutting members arranged for receiving an independent, loose tenon member. The jig is capable of providing the usual preformed bored and chiseled apertures defining conventional square-cornered mortises. Conventional mortises are formed by means of either a square four-sided mortise chisel surrounding a rotating drill bit, or are predrilled to remove most of the material, the remaining surfaces being trimmed flat by simply using a carpenter's maul and a hand-held chisel.

One embodiment of the improved jig includes a jig body for longitudinally supporting a slidable guide bar with predetermined indexing holes for use in incrementally positioning multiple guide bar drill holes over a workpiece member to provide a mortise therein.

The axis of the drill holes are preferably normal to the plane coextensive with the axis of the respective indexing holes. The jig further includes a removable, transversely positioned indexing pin which is slidably received by the respective indexing holes in the slidable guide bar to ensure pre-aligned indexed drilling positions. Alternatively, the jig may include a removable threaded indexing pin which is received by respective threaded indexing holes in the slidable guide bar. Thus, the indexed guide bar indexing holes will permit superior and secure positioning of the pre-spaced drill guide holes to produce a uniform and accurate mortise ensuring a strong loose tenon joint.

Accordingly, the device and method disclosed herein may generally be defined as: A drilling jig comprising a stationary body having an indexing aperture, a drill guide bar arranged for slidable engagement with respect to the body. The guide bar including a series of longitudinally spaced thru-bores for receiving and axially guiding a drill bit and at least two longitudinally spaced indexing holes lying in a longitudinal plane angularly relative to the axis of said thru-bores, and a removable indexing pin arranged for insertion and withdrawal into and out of respective indexing holes in said guide bar and said indexing aperture or said stationary supporting body.

The drilling jig wherein the indexing aperture of the stationary body includes at least one elongated slot, and the longitudinally spaced indexing holes and cooperating indexing pin are threaded. Preferably, thumbscrews are used as the threaded indexing pins, thus allowing one to loosen the pins and slide the guide bar without a need to completely remove the pins.

The drilling jig wherein the supporting body may be of general U-shape defining at least one upstanding side wall including the indexing aperture and being slidably engageable with the guide bar.

The drilling jig wherein the axial plane of the thru-bore may be substantially perpendicular to the longitudinally plane of the guide bar indexing holes.

The drilling jig wherein the supporting body may also include clamping members extending laterally from opposite sides of the body and including releasable clamping means arranged to engage with and be supported by a workpiece to be drilled by the drill bit.

The drilling jig wherein the supporting body includes a clamping plate whereby a releasable clamping means may be arranged to engage the clamping plate to support the drilling jig by a workpiece.

The drilling jig wherein the guide bar indexing holes may be longitudinally spaced from one another to temporarily retain the drill-receiving thru-bores in axially spaced position for drilling a mortise in a workpiece, the mortise having oppositely disposed surfaces configured to define a series of adjoining, slightly overlapping arc-shaped undulations.

The drilling jig wherein the preset drill guide holes and indexing holes may be longitudinally spaced to provide a series of adjacent drilled mortise borings having equally spaced radii in approximate tangentially engaging relationship.

The drilling jig wherein the clamping members may be secured to supporting side walls of the supporting body and including inverted depending surfaces each having a threaded hole for receiving a threaded shaft and means for turning the shaft to and from engagement with the workpiece.

Alternatively, and perhaps preferably, the drilling jig of the present invention may be described as comprising a stationary body having an aperture, and at least two drill guide structures arranged for engagement with said aperture with respect to said body. The first drill guide structure includes a set number of apertures for receiving and axially guiding a drill bit. The second drill guide structure includes one less aperture than the first drill guide structure. In this embodiment the drilling jig may further be of a design wherein the stationary body is of general rectangular shape defining at least one upstanding side wall and being engageable with said guide structure. Further, the drilling jig may also be of such a design wherein the stationary body includes clamping members extending laterally from opposite sides of said body and including releasable clamping means arranged to engage with and be supported by a workpiece to be drilled by the drill bit. Also, the drilling jig of the present invention may be of such design, wherein the clamping members are secured to supporting side walls of the stationary body and including inverted depending surfaces each having a threaded hole for receiving a threaded shaft and means for turning the shaft to and from engagement with the workpiece.

Additionally, the present invention may be described as a method of providing a loose tenon fastening system for joining a pair of abutting members. The method comprising forming a mortise in each of the members by drilling a series of equally spaced bores lying in a longitudinal plane and being spaced to provide a series of arc-shaped, undulating, oppositely disposed mortise surfaces and forming a loose, independent tenon member having opposite surfaces configured substantially identical to the undulating surfaces of the mortises, and inserting a portion of the tenon in a respective mortise and securing the tenon and mortise together.

The method wherein the securing step comprises the application of adhesive to the tenon and the respective mortises.

The method wherein the adjoining, arc-shaped undulations may have radii in slight overlapping relationship with respect to one another.

Consequently, it is a general object of the present invention to provide a jig used to form the respective mortises in mating pieces of a loose tenon joint for woodworking applications.

It is another object of the present invention to provide a jig with multiple guide holes for faster mortising, increased drilling accuracy, by maintaining full drill bit contact area and preset drill spacing.

It is a further object of the present invention to provide a jig which allows relatively deep mortises to be drilled, thereby increasing the gluing surface and strength of the joint.

A still further object of the present invention to provide a jig which may be operable with a conventional hand-held drill and inserted drill bit and which jig is portable to facilitate use on large and/or immobile pieces.

A further object is to provide a router bit having a multiply curved cutting surface whereby an independent tenon member is created having opposite surfaces configured substantially identical to the undulating surfaces of the mortises that are created with the improved drilling jig.

The above and further objects, details and advantages of the present invention, will be readily available from the detailed description and drawings to follow.

DESCRIPTION OF THE DRAWINGS

FIG. 3 is a top plan view of the jig and disclosed in the view of FIG. 1;

FIG. 4 is an end elevational view of the jig and supporting workpiece of FIG. 1 and 3, and positioned below and in axial alignment with a drill bit;

FIG. 5 is a side elevational view of the jig of FIG. 1 positioned on a workpiece and particularly illustrating the slidable guide bar indexing holes and removable indexing pin positioned in one of several indexing holes;

FIG. 10 is a top plan view of the jig as disclosed in the view of FIG. 1;

FIG. 11 is an end elevational view of the jig and supporting workpiece of FIGS. 8 and 10, and positioned below and in axial alignment with a drill bit;

FIG. 12 is a side elevational view of the jig of FIG. 8 position on a workpiece;

DETAILED DESCRIPTION

Figure 1:
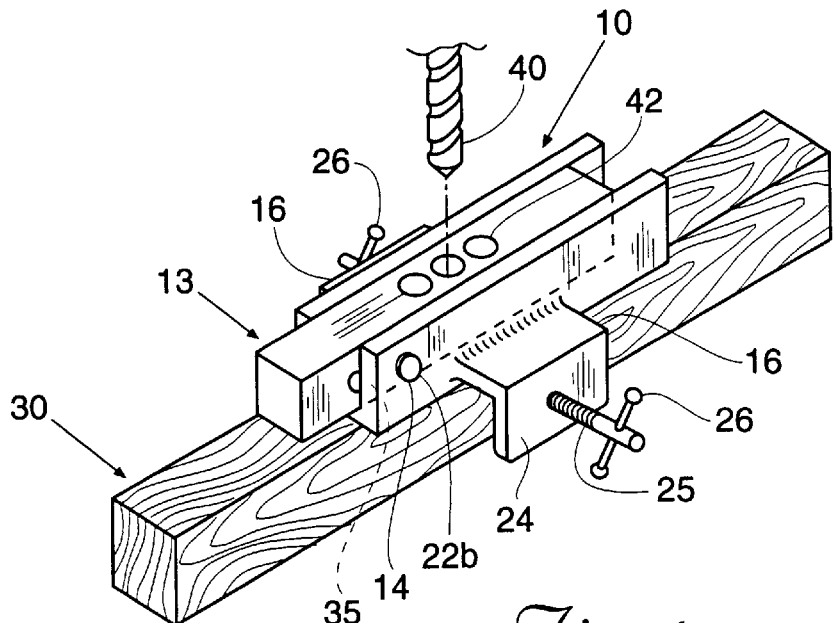
FIG. 1 is a perspective view of the improved jig shown secured to a wooden workpiece by means of oppositely disposed clamping devices.

Although the disclosure herein is detailed and exact to enable those skilled in the art to practice the invention, the physical embodiments herein disclosed merely exemplify the invention which may be embodied in other specific structure. While the preferred embodiment has been described, the details may be changed without departing from the invention, as defined by the claims.

With reference to FIGS. 1–6 inclusive, the improved jig of the present invention is designated generally by the reference numeral 10. The cooperating elements of the jig 10, as particularly shown in the exploded view of FIG. 2, comprises a generally U-shaped body, or stationary support member 12, a slidable guide bar 13 and an indexing pin 14. The U-shaped body 12 is provided with oppositely disposed clamps 16 formed integrally with and extending laterally from respective sidewalls 18 of the generally U-shaped supporting body 12. The upstanding sidewalls 18 are joined by a base or floor 20. Both of the sidewalls 18 include axially aligned apertures 22a and 22b arranged to receive a removable indexing pin 14. The stationary body 12, as previously mentioned, is provided with laterally extending, inverted L-shaped clamps 16 each preferably welded to a respective sidewall 18 of the body 12. The clamps 16 include downwardly (with respect to FIGS. 1 and 2) depending clamping wall surfaces 24. The wall surfaces 24 each have a threaded aperture for receiving a threaded clamping screw 25 arranged for clamping engagement with a workpiece 30 by means of a manually operable handle 26.

Figure 2:
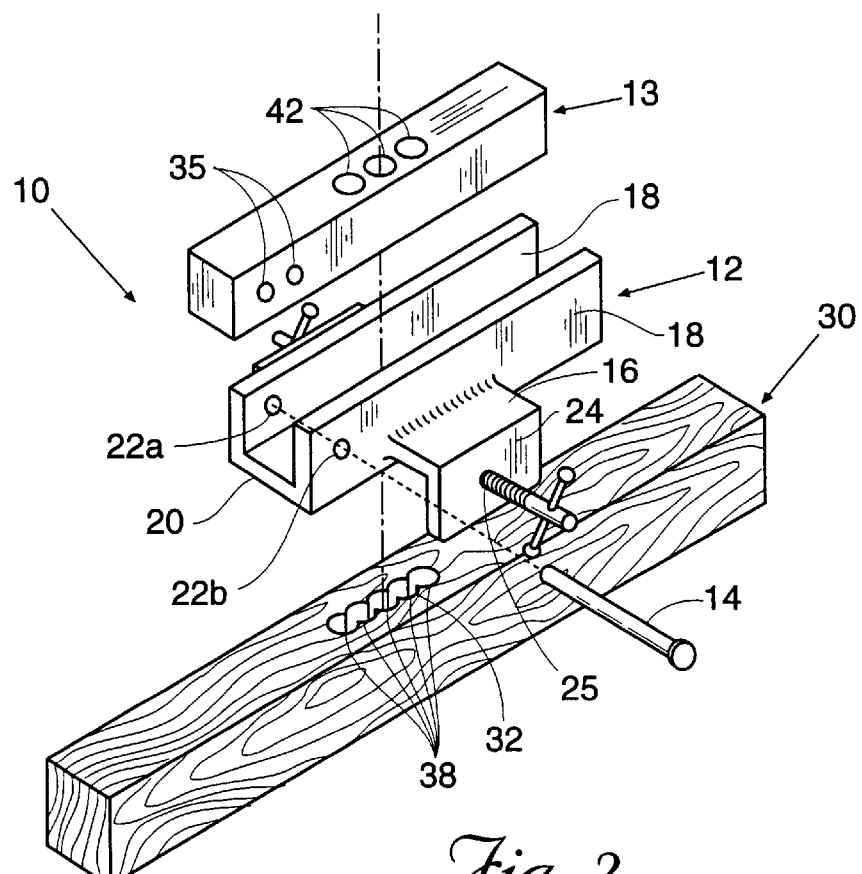
FIG. 2 is an exploded, perspective view illustrating overlapping pre-drilled mortise holes in a workpiece, and the improved jig elements being illustrated in alignment therewith.
Figure 6:
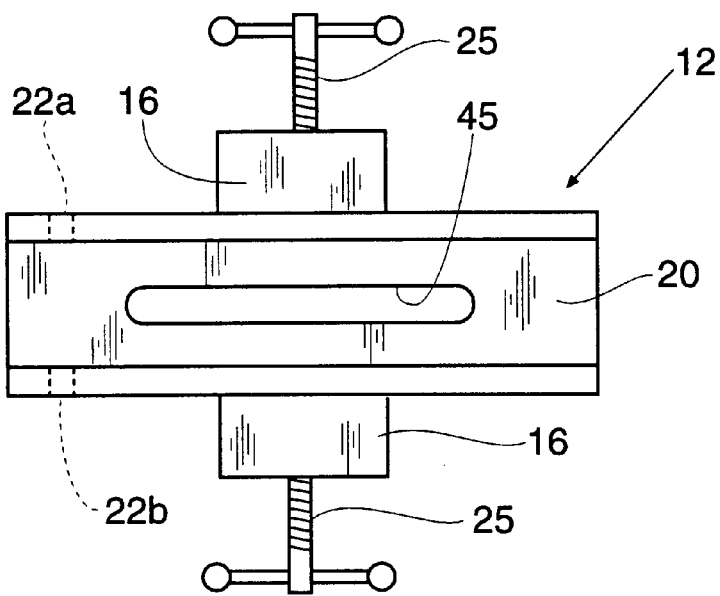
FIG. 6 is a top plan view of the jig base or stationary support member with the guide bar removed to particularly illustrate an elongated longitudinal slot formed in the bottom surface of the support member.

With reference to FIG. 2, the jig 10 is positioned with respect to the workpiece 30 at a preselected area defining the mortise 32, which will hereinafter be more specifically described. In order to provide the preferred configuration of the mortise 32, there is provided the slidable guide bar 13 having a series of longitudinally spaced drill guide holes 42 and coplanar indexing holes 35. Although 2 holes 35 are shown in the first embodiment, there may be provided more holes 35 provided along the length of the guide bar 13. The guide bar 13 rests on the floor 20 of the U-shaped body 12 and is arranged for longitudinal movement in either direction, to provide a means of selectively aligning the respective indexing holes 35 with the apertures 22a and 22b of the body sidewalls 18. Desired longitudinal spacing of the holes 35 is assured by means of insertion of the pin 14 through the aperture 22b, a respective indexing hole 35 and into the aperture 22a. Similar to the indexing pins 214, 215 shown in FIG. 13, a threaded indexing pin 215 may be inserted through an aperture 222b and into a threaded indexing hole 223. With reference to FIGS. 1, 2 and 5, it will be noted that a drill bit 40 is inserted into the drill guide holes 42 of the guide block 13 where the first series of mortising holes are bored. The drill bit 40 may be conveniently used with a hand-held drill (not shown) which permits facile movement to each of the pre-spaced boring holes 42. A second series of bored holes complete the mortise and are established by longitudinally moving the guide bar 13 with respect to the stationary body 12 after removal of the pin 14 from a first position with respect to a preselected indexing hole 35, and thereafter repositioning the pin 14 in the next adjacent indexing hole 35 of the guide bar 13. Depth of the mortise 32 may be established by means of a conventional drill stop (not shown) inserted on the drill bit 40. Attention is next directed to the top plan view of FIG. 6, wherein an elongated, longitudinal slot 45 is formed in the floor 20 of the body 12 to accommodate movement of the slidable guide bar 13 to any of its several indexing positions without obstruction of the floor 20 with respect to the drill bit 40. The drill bit 40 passes through the slot 45 into the pre-clamped workpiece for forming the mortise 32.

It is preferred to provide the arrangements of openings and holes in the guide bar 13 and the sidewalls 18, as shown in the views of FIGS. 1–6, wherein the axis of the drill bit 40 is maintained by the drill guide holes 42 with respect to the desired configuration of the resultant mortise 53 of the workpiece 30. That is, the axis of the drill bit 40 and the guide holes 42 is preferably normal or perpendicular to the plane passing through the axes of the indexing holes 35 of the guide bar 13.

Figure 7:
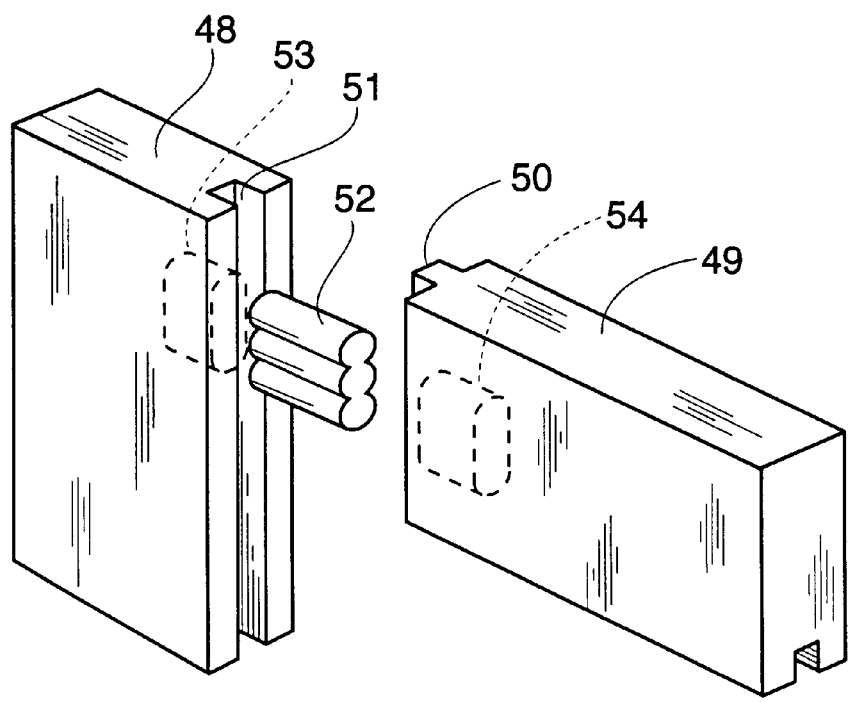
FIG. 7 is a perspective, exploded view illustrating a loose tenon-mortise system for joining two abutting members.

As will be apparent from the perspective, exploded view of FIG. 7, the loose tenon joinery system finds particular adaptation to the joining of rails and stiles that make up a wood door or window frame. As shown in FIG. 7, the usual abutting stile 48 and rail 49 have a tongue 50 and mating groove 51 utilizing an independent milled, loose tenon 52 arranged with portions being respectively seated in mortises 53 and 54 of the stile 48 and rail 49. The mortises 53 and 54, and tenon 52 may be formed to any desired depth and length, which may be readily accommodated by simply sawing off a preformed loose tenon 52 from its milled preformed (not shown). As is conventional practice, glue or other adhesive is applied to the surfaces of the mortises 53 and 54 and the tenon 52, with the system being held in glue clamps (not shown) for the appropriate time for setting the adhesive or glue.

It will be further apparent that the present invention has provided an improved drilling jig for configuring mortises of abutting wooden members to conform substantially with the configuration of a loose tenon member, both in the workshop or in the field, and thereby provide a versatile and facile assembly of the parts to be joined and secured together.

With reference to FIGS. 8–12 inclusive, a second embodiment of the improved jig of the present invention is designated generally by the reference numeral 100. The cooperating elements of the jig 100, as particularly shown in the exploded views of FIGS. 9A and 9B, comprises a generally rectangular-shaped body, or stationary support member 112 having oppositely disposed clamping members 116 formed integrally with and extending laterally from respective sidewalls 118 of the generally rectangular-shaped supporting body 112. The stationary body 112, as previously mentioned, is provided with laterally extending, inverted L-shaped clamping members 116 each preferably welded to a respective sidewall 118 of the body 112. The clamping members 116 include downwardly depending clamping wall surfaces 124. The wall surfaces 124 each have a threaded aperture for receiving a threaded clamping screw 125 arranged for clamping engagement with a workpiece 30 by means of a manually operable handle 126.

Figure 9:
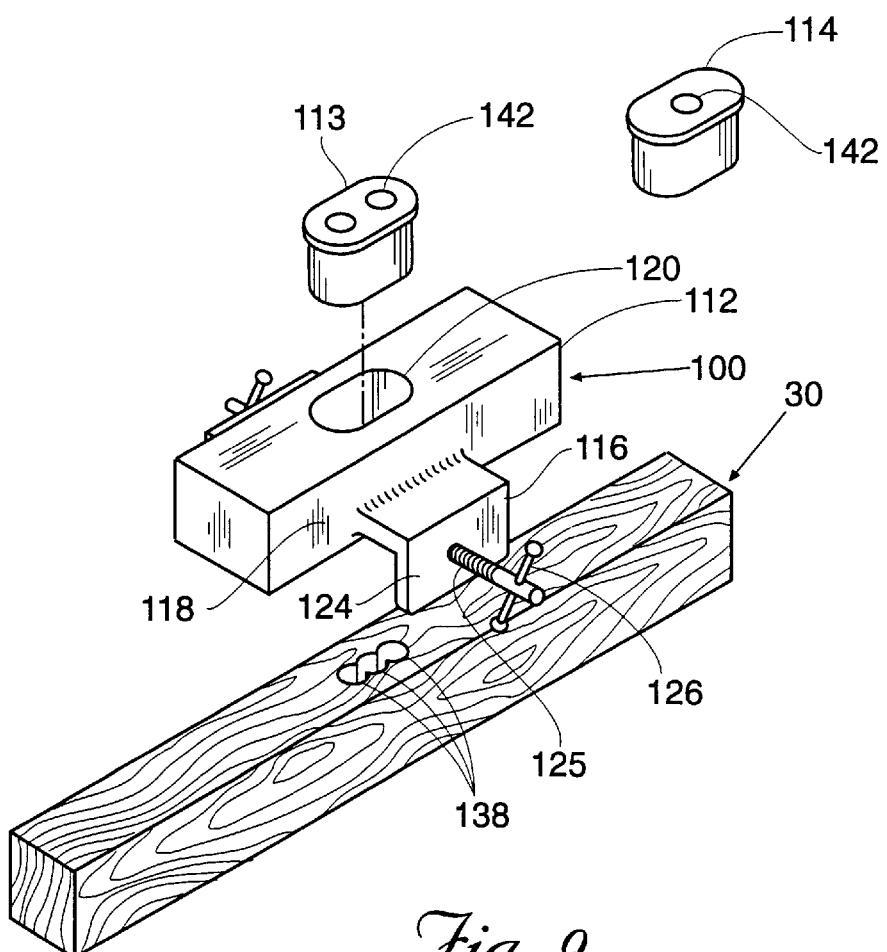
FIG. 9A is an exploded, perspective view illustrating overlapping pre-drilled mortise holes in a workpiece, an improved jig element being illustrated in alignment therewith.
FIG. 9B is an exploded, perspective view illustrating overlapping pre-drilled mortise holes in a workpiece, an improved jig element being illustrated in alignment therewith.
Figure 9A:
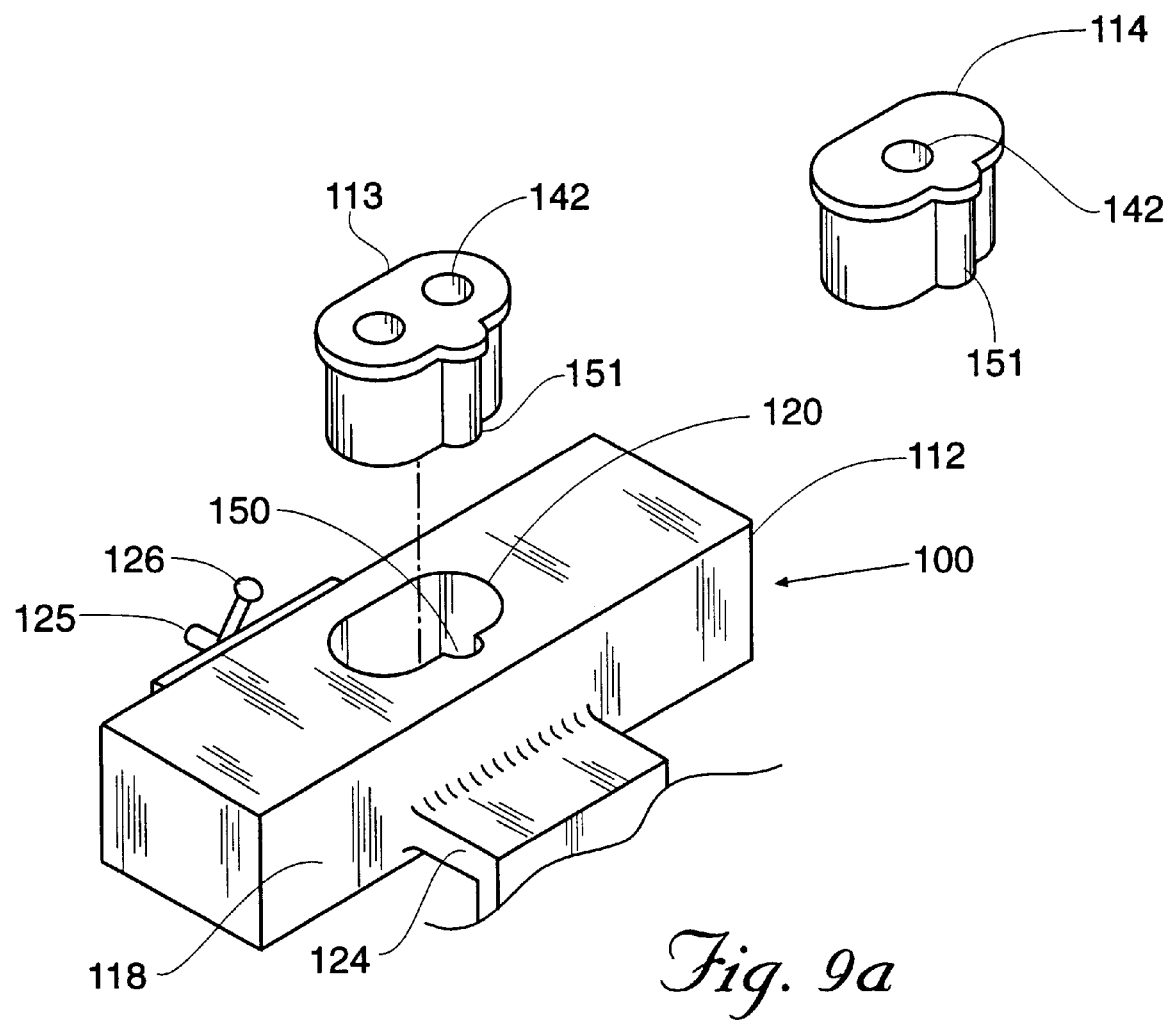
Figure 9B:
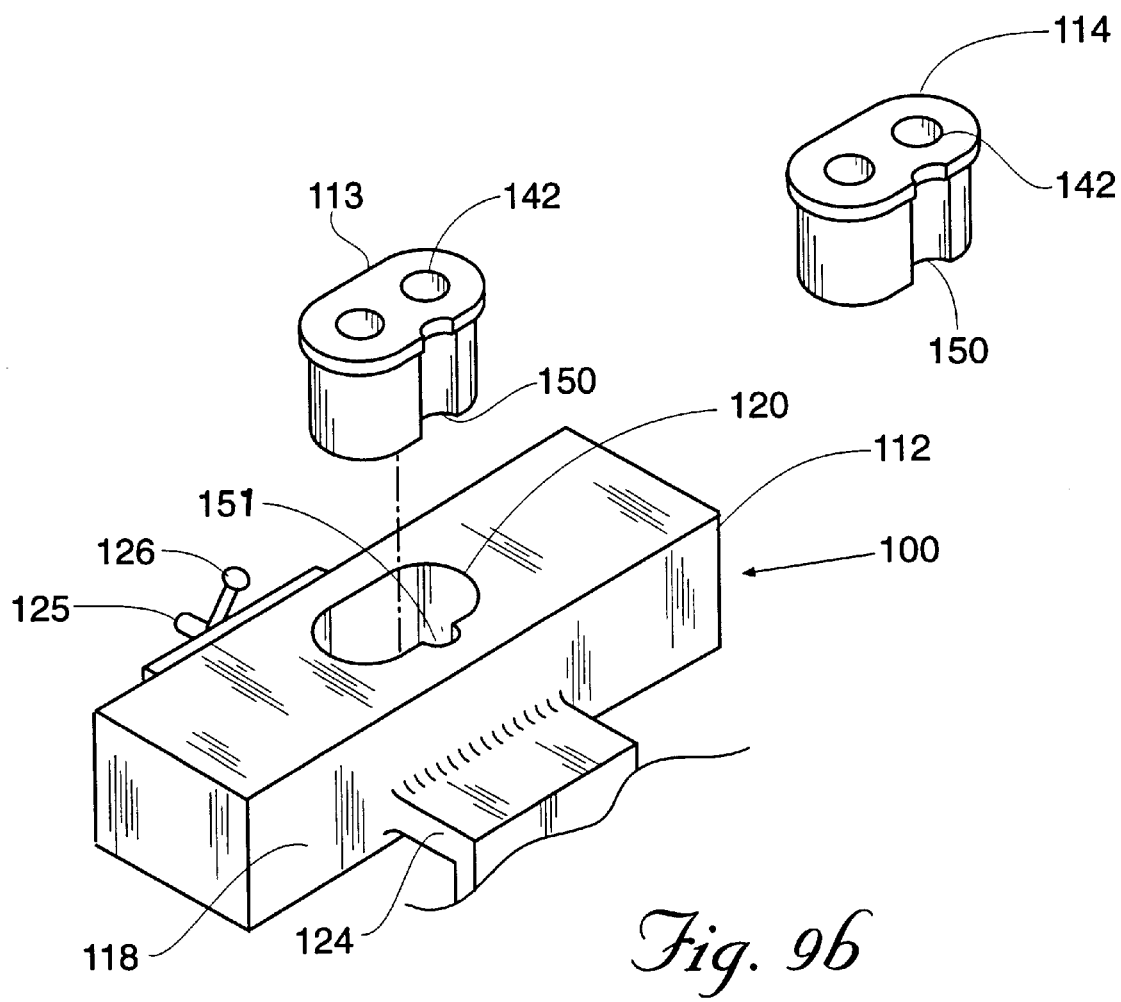

With reference to FIGS. 9A and 9B, the jig 100 is positioned with respect to the workpiece 30 at a preselected area defining the mortise 138. In order to provide the preferred configuration of the mortise 138, there is provided an elongated opening or slot 120 formed within the body 112. The slot 120 is sized to removably receive a first drilling guide 113 and a second drilling guide 114. Each drilling guide 113 and 114 has at least one longitudinally spaced co-planar indexing bushing, thru-bore or aperture 142. To ensure the drill bit 140 maintains correct axial alignment with aperture 142, the first drill guide 113 can have a set number of apertures and the second drill guide 114 can have one less aperture 142 than the first drill guide 113. Because the aperture or apertures 142 of the second drill guide 114 are positioned to create a hole or holes that lie between the holes created with the first drill guide 113, balanced drilling is maintained. That is, this arrangement ensures that either undrilled wood is on each side of the drill bit 140, as is the case using the first drill guide 113, or previously drilled holes are on each side of the drill bit 140, as is the case using the second drill guide 114. Although two thru-bores 142 are shown in first drilling guide 113 and one bushing 142 are shown in second guide 114 for purposes of illustration, there may be provided more thru-holes 142 along the length of each drilling guide 113 and 114. Each drilling guide 113 and 114 fits securely within elongated opening or aperture 120. To prevent each drilling guide 113 and 114 from turning when a rotating drill bit 140 is applied, the aperture 120 may be noncircular taking the shape of an elongated slot, a square, a rectangle, a triangle, a semicircle, or other suitable shape. The aperture 120 and drilling guides 113, 114, may also form a cooperating key 151 and keyway 150 structure or incorporate a type of pin that secures the drilling guides 113, 114 into place.

Figure 8:
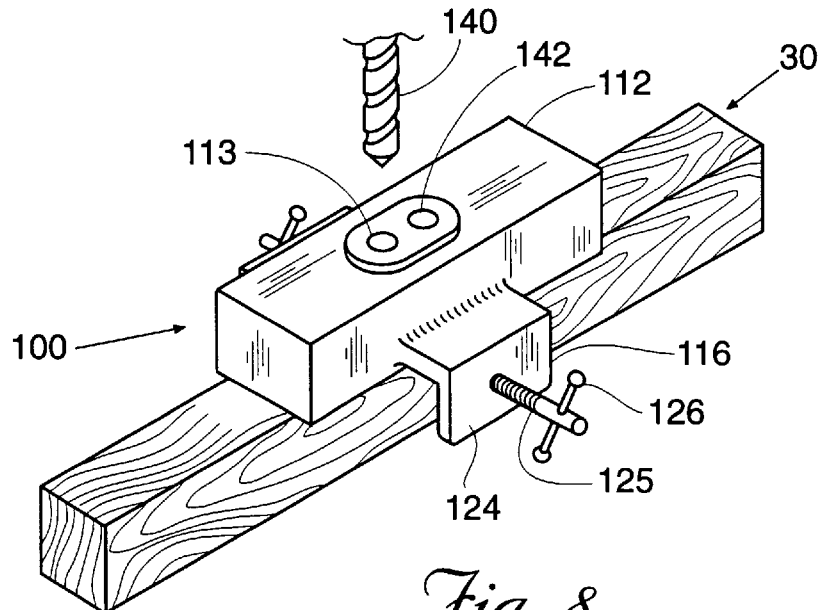
FIG. 8 is a perspective view of a second embodiment of the improved jig shown secured to a wooden workpiece by means of oppositely disposed clamping devices.

With reference to FIGS. 8 and 11, it will be noted that a drill bit 140 is inserted into the drilling guide 113 or 114 positioned within the jig body 112. The drill bit 140 may be conveniently used with a hand held drill (not shown) which permits movement to each of the several boring positions. After the drill bit 140 has been passed through the first inserted drilling guide 113 and the preset apertures have been formed within workpiece 30, the first drilling guide 113 is removed and the second drilling guide 114 is installed in elongated opening or slot 120. The drill bit 40 is then used to form the additional overlapping apertures within workpiece 30 to complete the mortise.

Depth of the mortise 32 may be established by means of a conventional drill stop (not shown) inserted on the drill bit 140. It is preferred to provide the arrangements of openings and holes in each drilling guide 113 and 114 as shown in the views of FIGS. 8–12, wherein the axis of the drill bit 140 is maintained by the thru-bore 142 with respect to the desired configuration of the resultant mortise 138 of the workpiece 30. That is, the axis of the drill bit 140 is preferably normal or perpendicular to the plane passing through the axes of the bushings 142 of each drilling guide 113 and 114.

Figure 13:
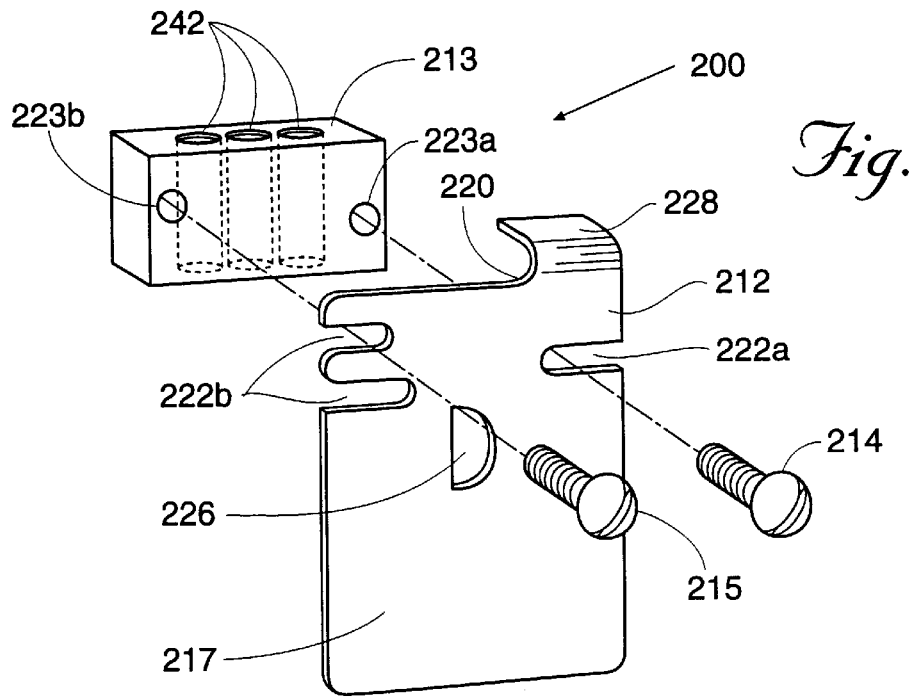
FIG. 13 is a perspective view of a third embodiment of the improved jig showing the use of threaded indexing pins and a clamping plate.
Figure 14:
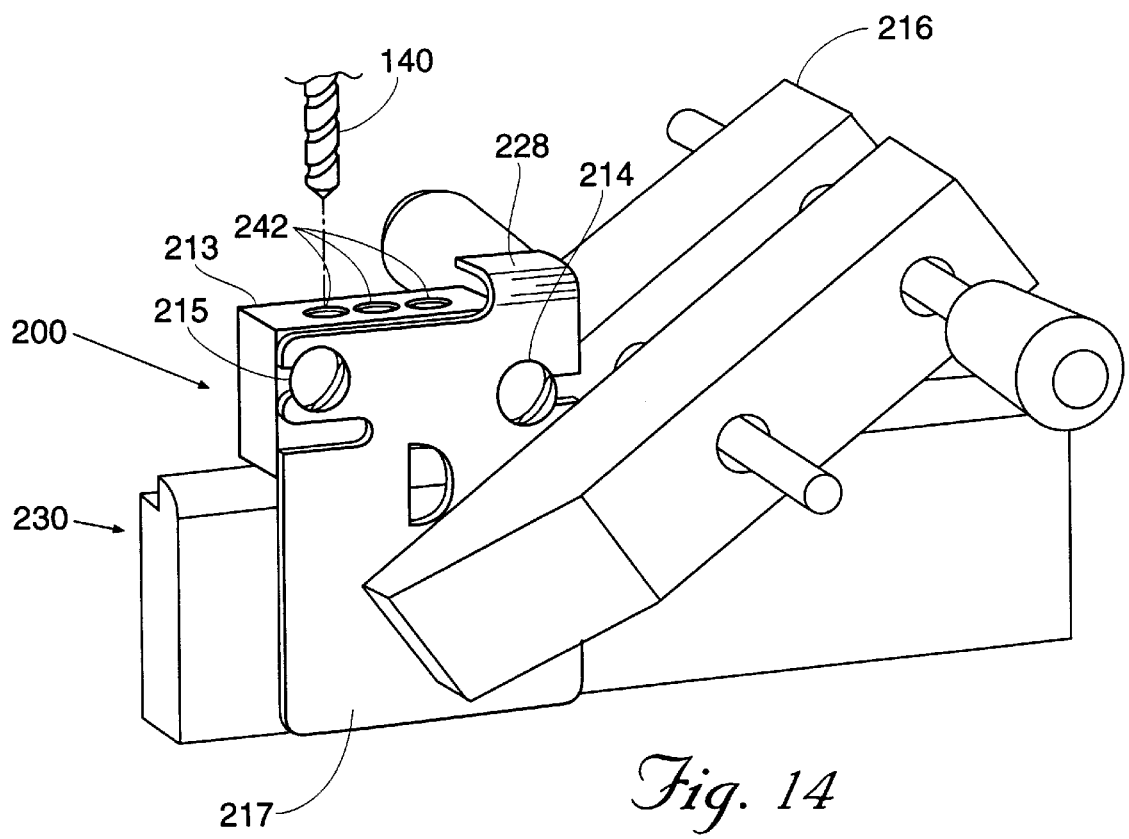
FIG. 14 is a perspective view of the improved jig disclosed in FIG. 13, shown secured to a wooden workpiece by a clamp.

With reference to FIGS. 13 and 14 inclusive, a third embodiment of the improved jig of the present invention is designated generally by the reference numeral 200. The cooperating elements of the jig 200, as particularly shown in FIG. 13, comprise a stationary support member 212, a slidable drilling guide bar 213 and at least one, preferably two, indexing pins 214, 215. The stationary support member 212 includes a clamping plate 217 whereby a clamp 216 may be situated to secure the jig 200 to a workpiece 230. The stationary support member 212 further includes at least one indexing hole 222 arranged to receive a removable indexing pin 214, 215.

The drilling guide 213 includes at least one thru-bore 242 to guide a drill bit 140, and at least one hole 223 for receiving an indexing pin 214, 215. Preferably, the indexing pins 214, 215 and indexing holes 223 are threaded and the indexing apertures 222 comprise elongated slots, thus ensuring longitudinal mobility of the drilling guide 213 when the threaded indexing pins 214, 215 are loosened.

With reference to FIG. 14, the jig 200 is positioned with respect to a workpiece 230 at a preselected area defining the mortise 32. In order to provide the preferred configuration of the mortise 32, there is provided a slidable drilling guide bar 213 having two threaded apertures 223a and 223b for receiving two threaded indexing pins 214, 215. A threaded aperture is provided near each end of the drilling guide bar 213. The guide bar 213 is arranged for longitudinal movement in either direction when the indexing pins 214, 215, previously being inserted through the indexing apertures 222a, 222b, are loosened. The guide bar 213 is secured to the inner surface 220 of the stationary support member 212 by tightening the indexing pins 214, 215. Although the indexing pins 214, 215 shown in FIG. 13 are thumb screws that can be easily manipulated with ones hands, the indexing pins could include allen-head set crews, or other comparable attachment devices.

The indexing apertures 222 are configured so that sliding the drilling guide bar 213 all the way to one side provides a first setting, and sliding the drilling guide bar 213 all the way to the opposite side provides a second setting. Different sized indexing apertures 222b may then be provided to allow suitable settings for different sized drilling guide bars 213 having different sized thru-bores 242.

As shown in FIGS. 13 and 14, the improved jig 200 may include an alignment aperture 226 whereby one may properly align the drilling jig 200 with a mark placed on the workpiece 230. The improved jig 200 may further include a drill block structure 228 that covers one aperture 242 of the drilling guide 213 when translated to the second setting. The first setting of the drilling guide 213 exposes all apertures 242 to be drilled. The drill block structure 228 blocks drill bit 140 access to one aperture 242 when drilling guide 213 is translated to the second drilling position. That is, at the first setting a set number of thru-bores 242 are used to drill a set number of holes. At the second setting, one less thru-bore 242 is used to drill one less hole. Because the thru-bore or thru-bores 242 at the second setting are positioned to create a hole or holes that lie between the holes created at the first setting, balanced drilling is maintained. This configuration ensures balanced drilling as either undrilled wood, as is the case at the first setting, or previously drilled holes, as is the case at the second setting, are on either side of drill bit 140 during drilling.

The preferred method for creating a loose tenon joint with the third embodiment of the drilling jig 200 includes sliding the drilling guide 213 to a first setting and tightening the indexing pins 214, 215, clamping the jig 200 to a workpiece 216, axially guiding a drill bit 140 through the thru-bores 242 and into the workpiece 216, loosening the indexing pins 214, 215, sliding the drilling guide 213 to a second setting that preferably includes covering one of the thru-bores with a drill block structure 228, tightening the indexing pins 214, 215, and axially guiding a drill bit through the thru-bores and into the workpiece, thereby creating a mortise. In a like manner, a mortise is created in a second workpiece.

Figure 15:
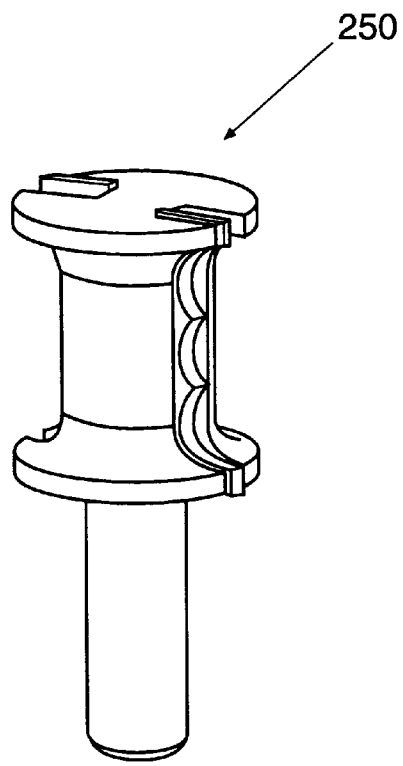
FIG. 15 is a perspective view of one embodiment of an improved router bit whereby a suitable independent tenon member is created.
Figure 16:
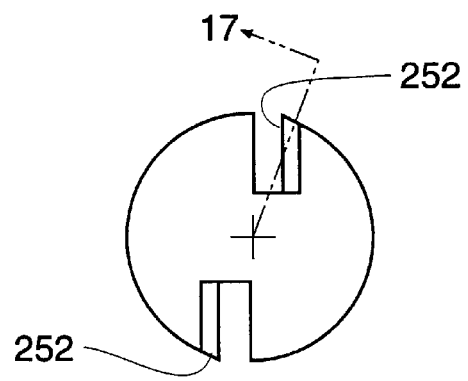
FIG. 16 is a top plan view of the router bit of FIG. 15.
Figure 17:
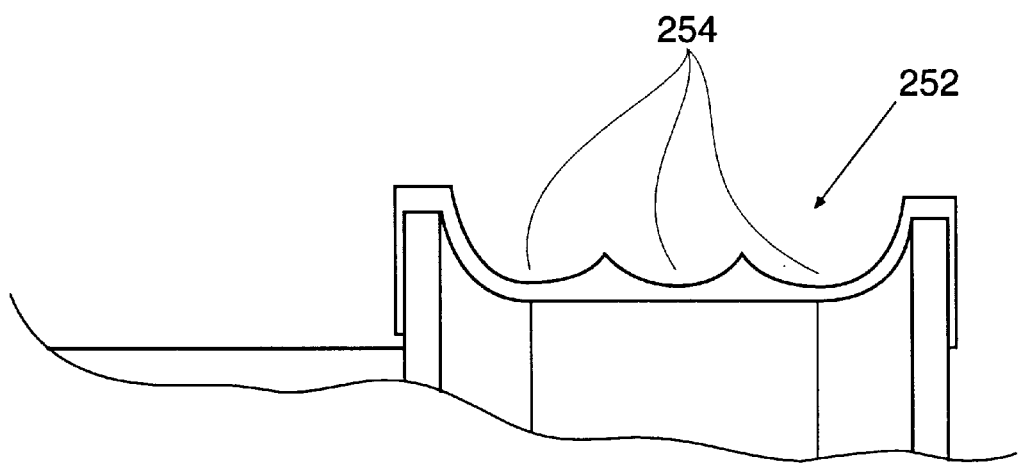
FIG. 17 is a cross sectional view taken along line 17 of FIG. 16.

As shown in FIG. 7, once mortises 53 and 54 are created, a loose tenon 52 is used to complete the joint. The tenon 52 may be created using a router bit 250 like the one shown in FIGS. 15–17. The router bit 250 includes a cutting edge 252 having a plurality of curved portions 254. The size and number of curved portions 254 should match the size and number of holes created with the drilling jig 10, 100, or 200. Thus ensuring an independent tenon 52 having opposite surfaces configured substantially identical to the undulating surfaces of the mortises 53 and 54.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is hereinafter defined by the claims.

What is claimed is:

1. A drilling jig comprising:
   a stationary body having at least one aperture;
   a first drilling guide structure arranged for engagement with said aperture, said first drilling guide structure including a set number of thru-bores for receiving and axially guiding a drill bit;
   a second drilling guide structure arranged for engagement with said aperture, said second drilling guide structure including one less thru-bore than said first drill guide structure;
   a releasable clamping mechanism.

2. A drilling jig comprising:
   a stationary support member having at least one indexing aperture, an alignment aperture, and a clamping plate;
   a drilling guide structure having at least one thru-bore for receiving and axially guiding a drill bit, and at least one indexing hole;
   at least one indexing pin cooperating with said indexing aperture and said indexing hole whereby said drilling guide structure is secured to said stationary suport member.

3. The releasable clamping mechanism of claim 1 including a plurality of clamping members extending laterally from opposite sides of said stationary body, a plurality of inverted surfaces each having a threaded hole, and a threaded shaft cooperating with said threaded hole, said shaft including a mechanism for turning said shaft to and from engagement with a workpiece.

4. The drilling jig of claim 1 wherein:
   at least one drilling guide structure includes a key structure.

5. The drilling jig of claim 1 wherein:
   at least one drilling guide structure includes a keyway structure.

6. A drilling jig comprising:
   a stationary support member having at least one indexing aperture, a drill block structure, and a clamping plate;
   a drilling guide structure having at least one thru-bore for receiving and axially guiding a drill bit, and at least one indexing hole;
   at least one indexing pin cooperating with said indexing aperture and said indexing hole whereby said drilling guide structure is secured to said stationary support member.

7. A method for creating a loose tenon joint, said method comprising:
   a. providing a drilling jig including a stationary support member having at least one indexing aperture and a clamping plate, a drilling guide structure having at least one thru-bore and at least one indexing hole, at least one indexing pin cooperating with said indexing hole and said indexing aperture whereby said drilling guide structure is secured to said stationary support member;
   b. sliding said drilling guide structure to a first setting and tightening said indexing pin;
   c. clamping said jig to a workpiece;
   d. axially guiding a drill bit through said thru-bores and into said workpiece;

e. loosening said indexing pin;

f. sliding said guide bar to a second setting and tightening said indexing pin;

g. axially guiding a drill bit through at least one of said thru-bores and into said workpiece, thereby creating a mortise.

8. The method of claim 7 wherein:

said drilling jig includes an alignment aperture;

said workpiece includes a witness mark; and said method further comprises aligning said alignment aperture with said witness mark.

9. The method of claim 7, further comprising providing a second workpiece and repeating steps b through g of claim 7 on said second workpiece, thereby creating a second mortise.

10. The method for creating a loose tenon joint of claim 9, further comprising:

providing a tenon having a first end and a second end;

inserting at least a portion of said first end of said tenon into said mortise formed in said workpiece;

inserting at least a portion of said second end of said tenon into said second mortise formed in said second workpiece.

11. The method of claim 9 wherein the step of providing a tenon further comprises:

providing a third workpiece;

providing a router bit having a cut profile including a plurality of curved portions;

applying said router bit to said third workpiece, thereby creating said tenon.

12. A drilling jig comprising:

a stationary body having at least one noncircular aperture;

at least two drilling guide structures arranged for engagement with said aperture, said drilling guide structures including at least one thru-bore for receiving and axially guiding a drill bit;

a releasable clamping mechanism.

13. The releasable clamping mechanism of claim 12 including a plurality of clamping members extending laterally from opposite sides of said stationary body, a plurality of inverted surfaces each having a threaded hole, and a threaded shaft cooperating with said threaded hole, said shaft including a mechanism for turning said shaft to and from engagement with a workpiece.

14. The drilling jig of claim 12 wherein:

said drilling guide structures include a key;

said noncircular aperture includes a keyway; and said key cooperates with said keyway.

15. The drilling jig of claim 12 wherein:

said drilling guide structures include a keyway;

said noncircular aperture includes a key: and said key cooperates with said keyway.

\* \* \* \* \*